Patented Nov. 28, 1933

1,936,976

UNITED STATES PATENT OFFICE 1,936,976

CELLULOSE ESTER

Franz Becker, Dessau in Anhalt, Germany, assignor to I. G. Farbenindustrie Aktiengesellschaft, Frankfort-on-the-Main, Germany No Drawing. Application December 5, 1930, Serial No. 500,440, and in Germany December 31, 1929

5 Claims. (Cl. 260—101)

My present invention relates to a new process of producing esters of the cellulose series and more particularly to such a process in which genuine cellulose, cellulose pretreated in the known manner with alkalies or mineral or organic acids, or finally cellulose partially esterified or etherified, is further esterified in a two stage process.

In my specification Ser. No. 191,537, filed May 14, 1927, I disclosed a two stage process of esterifying cellulose with sulfuric acid acting as catalyst by treating the cellulose in the first stage of the esterification with a relatively small proportion of sulfuric acid generally essentially less than 2 per cent of free sulphuric acid, and completing the esterification by adding a further quantity of the catalyst. A quick esterification is thus produced. A strong reaction is initiated and considerable cooling is therefore required, especially when starting the acylating process on a large scale.

According to my present invention the difficulties connected with a thorough cooling of the reaction mixture can be avoided by using in the second stage besides the free sulfuric acid bound sulfuric acid in form of acid salts or esters. This involves the advantage that the reaction takes a gentle course in the second stage so that there is sufficient time for eliminating the reaction heat produced. Hence no strong cooling is required, and when manufacturing on a large scale the batches can be much larger and the conditions are particularly favorable for obtaining uniform products economically.

When esterifying in the second stage a finished mixture of esterifying agent containing free or bound sulfuric acid may be added. This mixture can be produced by combining neutral and acid salts or esters of sulfuric acid or salts of other acids, e. g. sodium acetate, with sulfuric acid in presence of diluents, e. g. acetic acid. It is likewise possible to produce the mixture of esterifying agent in the very esterification mixture by first adding the acid binding constituents and then the free sulfuric acid. By way of example some suitable sulfates are enumerated, the invention, however, not being limited to them: sodium or ammonium sulfate or bisulfate, diethylamine sulfate, pyridine sulfate, dimethyl sulfate, diethyl sulfate. In general there may be applied all acid binding substances which do not form with sulfuric acid compounds insoluble in the esterification mixture. The proportion of free and bound sulfuric acid depends upon the kind and the volume of the reaction mixture. With increasing volume the percentage of the promoter generally decreases.

The favorable effect of sulfates used besides a small amount of free sulfuric acid in the acylating process, may be explained by the fact that in the second stage, as in the application of free sulfuric acid, a great proportion of sulfuric acid esters of the cellulose is formed whereat the esterification with the aid of organic acids is highly facilitated. The advantage of the present process over the process wherein greater amounts of free sulfuric acid are present, lies in the fact that, as already mentioned, the final esterification takes a slower course and admits a raised temperature, so that comparatively little cooling, for instance, with ordinary tap water is sufficient and cooled brine need not be used.

The esterification process described is well suited for the manufacture of simple or mixed cellulose esters of any kind, for instance, of cellulose acetate, cellulose butyrate, cellulose acetate-butyrate, cellulose nitrate acetate and cellulose ether esters.

Besides cellulose there may be used as starting materials any kind of pretreated cellulose, for instance, cellulose pretreated with an organic acid, such as formic acid, acetic acid and butyric acid. Cellulose derivatives pretreated with inorganic acids, for instance, feebly nitrated cellulose, may likewise be esterified according to the present invention, also cellulose ethers still having free hydroxyl groups.

The following examples illustrate the invention:

*Example 1.*—400 grams of short-fibered bleached linters, 1200 grams of acetic acid, 4 grams of sulfuric acid of 95 per cent strength, are stirred or shaken for 6 hours. 1200 grams of acetic anhydride are added and the mixture is stirred at about 20–30° C. until a uniform smeary fiber pulp is produced from which no more liquid can be expressed. There is then further added a mixture consisting of 16.4 grams of anhydrous sodium acetate and 25.6 grams of sulfuric acid of 95 per cent strength, corresponding to 24 grams of sodium bisulfate and 6 grams of free sulfuric acid, preferably dissolved in 50–100 grams of acetic acid. The acetylation proceeds and after about one hour, during which time the temperature may rise to 35° C., the mass is smooth and free from fibers. This primary solution of cellulose acetate may be worked up, for instance, spun either as such or, if necessary, after its stabilization and a more or less extensive hydrolyzation, if necessary, with addition of a suitable diluent, for instance, acetic acid, or the primary solution is subjected to a hydrolysis with water, for instance, until solubility in acetone is obtained, and then the product is precipitated in water.

Example 2.—400 grams of comminuted bleached linters, 800 grams of glacial acetic acid, 400 grams of butyric acid, and 4 grams of sulfuric acid of 95 per cent strength are treated as indicated in Example 1. Then 1200 parts of acetic anhydride are added and stirring is continued at about 20–30° C. until a homogeneous fiber pulp is produced in which the cellulose is esterified as far as the monoacetate. Then are first added 16.4 grams of sodium acetate dissolved in 50 grams of glacial acetic acid and after well mixing there are further added 25.6 grams of sulfuric acid, likewise diluted with 50 grams of glacial acetic acid.

When the acetylation is complete, the ester is rendered soluble in acetone by adding water to the acetylation mixture. The cellulose butyrate acetate thus obtained yields a film which is appreciably less sensitive to water than is the pure cellulose acetate film.

Example 3.—The operations are those described in Example 1, but in the second stage there are added instead of 16.4 grams of sodium acetate 17 grams of sodium nitrate and after ¼ of an hour 25.6 grams of sulfuric acid. A nitrate acetate of a small content of nitrogen is obtained. It yields a film which has a good strength and is very stable to water.

Example 4.—400 grams of nitrated cotton containing 2 per cent of nitrogen, 1200 grams of glacial acetic acid, and 4 grams of sulfuric acid are stirred or shaken for 6 hours at 20–25° C., 800 grams of acetic anhydride in a strongly cooled state are then added during a quarter of an hour. The temperature rises to about 30–40° C. The mass is then cooled and kept at 20° C. until a uniform fibrous magma has been produced from which no more liquid can be expressed. 9 grams of pyridine and 18 grams of sulfuric acid dissolved in 90 grams of glacial acetic acid are now added within 10 minutes. The temperature is maintained at 20–30° C. and after about 1½ hours the mass is smooth and free from fibers. Dilute aqueous sulfuric acid is added and hydrolysis is effected until the mass is soluble in acetone. The nitrate acetate obtained has a nitrogen content of about 1.3 per cent.

In the following claims the term "cellulosic compound" is intended to include as well genuine cellulose as pretreated cellulose containing, however, still unsubstituted hydroxyl groups.

What I claim is:—

1. A process for esterifying a cellulose compound containing esterifiable hydroxyl groups which comprises treating the starting material in the presence of a diluent with an amount of sulfuric acid comprising less than 2 per cent. of free sulfuric acid calculated on the weight of the cellulose compound, adding a fatty acid anhydride, esterifying the cellulose compound partially, and treating the reaction product thus obtained with a mixture of free sulfuric acid and at least one compound of the group, consisting of neutral and acid salts, and neutral and acid esters of sulfuric acid, said compounds being soluble in the reaction mixture.

2. A process for esterifying a cellulose compound containing esterifiable hydroxyl groups which comprises treating the starting material in the presence of a fatty acid with an amount of sulfuric acid comprising less than 2 per cent. of free sulfuric acid calculated on the weight of the cellulose compound, adding a fatty acid anhydride, esterifying the cellulose compound partially and treating the reaction product thus obtained with a mixture of free sulfuric acid and at least one compound of the group consisting of acid salts and acid esters of sulfuric acid, said compounds being soluble in the reaction mixture.

3. A process for esterifying a cellulose compound containing esterifiable hydroxyl groups which comprises treating 400 parts by weight of short-fibered, bleached linters with 1200 parts by weight of acetic acid and 4 parts by weight of sulfuric acid of 95 per cent strength, adding 1200 parts by weight of acetic anhydride and stirring the mixture at about 20 to 30° C. until a uniform, smeary fiber pulp is produced from which no more liquid can be expressed, and treating the reaction product thus obtained with a mixture of 16.4 parts by weight of anhydrous sodium acetate and 25.6 parts by weight of sulfuric acid of 95 per cent strength, corresponding to 24 parts by weight of sodium bisulfate and 6 parts by weight of free sulfuric acid, the reagents being preferably dissolved in 50 to 100 parts by weight of acetic acid, during which second stage the temperature of the reaction mixture may rise to about 35° C., until the mass is smooth and free from fibers.

4. A process for esterifying a cellulose compound containing esterifiable hydroxyl groups which comprises treating 400 parts by weight of comminuted bleached linters with 800 parts by weight of glacial acetic acid, 400 parts by weight of butyric anhydride and 4 parts by weight of sulfuric acid of 95 per cent strength, adding 1200 parts by weight of acetic anhydride and stirring the mixture at about 20 to 30° C. until a homogeneous fiber pulp is produced in which the cellulose is esterified as far as the monoacetate, and treating the reaction product thus obtained with 17 parts by weight of sodium nitrate diluted in 50 parts by weight of acetic glacial acid and 25.6 parts by weight of sulfuric acid diluted in 50 parts by weight of acetic acid until acetylation is complete.

5. A process for esterifying a cellulose compound containing esterifiable hydroxyl groups which comprises in a first stage treating 400 parts by weight of nitrated cotton containing 2 per cent of nitrogen with 1200 parts by weight of glacial acetic acid and 4 parts by weight of sulfuric acid of 95 per cent strength at about 20 to 25° C., adding 800 parts by weight of acetic anhydride in a strongly cooled state while allowing the temperature of the mass to rise to about 30–40° C., cooling hereafter the mass to a temperature of 20° C. and keeping it at this temperature until a uniform fibrous magma has been produced from which no more liquid can be expressed, and treating the reaction product thus obtained with 9 parts by weight of pyridine and 18 parts by weight of sulfuric acid dissolved in 90 parts by weight of glacial acetic acid at a temperature of about 20 to 30° C., until the mass is smooth and free from fibers.

FRANZ BECKER.